Patented May 13, 1947

2,420,386

UNITED STATES PATENT OFFICE 2,420,386

REDUCTION OF CORROSIVE ACTION OF FRIEDEL-CRAFTS TYPE CATALYSTS

William Rusler Smith and William F. Glassmire, Port Arthur, Tex., assignors to The Texas Company, New York, N. Y., a corporation of Delaware No Drawing. Application June 8, 1945, Serial No. 598,414

4 Claims. (Cl. 260—683.5)

This invention relates to the reduction of the corrosive action of Friedel-Crafts type catalysts and particularly catalysts of this type employed in the catalytic conversion of hydrocarbons.

The invention contemplates reducing the corrosive action of catalysts of the aluminum halide-hydrocarbon complex type employed in effecting hydrocarbon conversion reactions by maintaining the catalyst at an elevated temperature not exceeding about 250° F. for a prolonged period of time prior to use, such that the complex catalyst is rendered substantially non-corrosive to ordinary boiler steel. In accordance with the invention, the complex catalyst is subjected to heating at a temperature in the range about 180 to 225 or 250° F. for a period of time ranging from about 30 to 60 hours or more. With longer heating periods somewhat lower temperature may be used, for example as low as 150° F. At least about 40 to 50 hours heating at a temperature of around 200 to 210° F. effectively reduces the corrosive action of the complex catalyst.

Aluminum halide catalysts in the form of a fluid aluminum halide-hydrocarbon complex with or without unreacted aluminum halide suspended therein are useful catalysts for effecting isomerization of hydrocarbons. They are particularly effective for isomerizing normal paraffin hydrocarbons such as normal butane to produce isoparaffins. They are also useful for isomerizing normally liquid hydrocarbon constituents or fractions of straight-run gasoline.

The isomerization reaction is usually carried out by passing the hydrocarbons undergoing treatment in contact with a mass of the fluid complex catalyst maintained in the presence of a promoter such as hydrogen chloride within a reaction vessel or tower. It has been found, however, that the metal surfaces of reaction vessels and auxiliary equipment fabricated from ordinary iron and steel upon exposure to contact with the catalyst under the reaction conditions usually prevailing suffer substantial corrosion. The reasons for this corrosive action and the nature of the substances in the catalyst responsible therefor are not understood. The corrosion action, however, is of such extent that frequent replacement of parts of the equipment is necessary or else resort must be had to the use of expensive alloy equipment or to the employment of other means, such as lining the equipment with ceramic or other materials.

It has been discovered that these difficulties can be avoided by subjecting the complex catalyst to an elevated temperature for a substantial period of time so as to render it substantially non-corrosive to ordinary steel such as boiler steel.

For example, a sample of aluminum chloride-hydrocarbon complex catalyst such as used in isomerizing normal butane was placed in a beaker maintained at about 210° F. The test specimen of boiler steel was suspended in the hot complex for a period of about 5 hours. Thereafter the test specimen was removed and inspected to determine the loss of metal. This loss of metal, calculated on the basis of inches penetration per year, was found to be about 2.9 inches.

A similar sample of this complex catalyst was subjected to heating for a period of about 48.7 hours at an average temperature of about 218° F. in the absence of test specimens. Three boiler steel specimens were then inserted in the heat-treated complex and maintained therein for a period of about 5 hours at a temperature of 218° F. The loss of metal from these three specimens corresponded to corrosion rates of 0.048, 0.046 and 0.054 inch penetration per year respectively.

Heating the same type of complex for a period of only about 5 hours under substantially similar temperature conditions resulted in no appreciable reduction in the corrosive nature of the complex.

The complex which had been subjected to the foregoing 48.7 hour heat treatment and subsequent corrosion test was thereafter treated by bubbling hydrogen chloride gas through it for a period of about 17.5 hours while maintained at a temperature of about 125° F. Before treatment with the hydrogen chloride the complex was quite black and viscous, and after bubbling hydrogen chloride through it for about 2 hours at atmospheric pressure it became more fluid and regained the usual red color. At the end of the treating period the complex was quite fluid and of red color. Three test specimens of boiler steel were submerged in the thus treated complex for a period of 5 hours at a temperature of 210° F. The loss of metal from these specimens indicated corrosion rates of 0.025, 0.026, and 0.025 inch penetration per year respectively. These rates are essentially 50% less than the rates obtained for this complex before the treatment with hydrogen chloride.

From the foregoing it is apparent that by subjecting the complex catalyst to elevated temperature for a substantial period of time the catalyst can be rendered substantially non-corrosive.

The complex catalysts in question may be formed as a result of interaction between the metallic halide and various types of hydrocarbons including chlorinated hydrocarbons. Besides aluminum, other Friedel-Crafts metallic halides may be used such as aluminum bromide.

The complex catalyst used in isomerization of normal butane, for example, may be a preformed complex prepared by reacting substantially anhydrous aluminum chloride with paraffinic hydrocarbons boiling in the range of gasoline and kerosene at temperatures of about 200 to 250° F. in the presence of hydrogen chloride or other hydrogen halide under conditions to produce a complex characterized by having an apparent heat of hydrolysis in the range about 280 to 360 or about 320 to 350 small calories per gram of complex as measured by the temperature rise of the water in the calorimeter employed in the test, and equivalent to an absolute heat of hydrolysis in the range of about 298 to 384 or about 341 to 373 small calories per gram of complex when corrected to include the heat also absorbed by the calorimeter.

In employing such a complex for the continuous isomerization of normal butane it is customary to fortify the catalyst by the periodic or continuous addition of a small amount of aluminum halide. This addition is usually accomplished by dissolving a small amount of aluminum chloride in the hydrocarbon feed stream passing to the reaction vessel or by dissolving it in a separate stream of feed hydrocarbons passing to the reaction vessel. This fortification results in the formation of complex in situ during the course of the isomerization reaction as a result of interaction between added aluminum halide and feed hydrocarbons. The aluminum halide addition is regulated to maintain the catalyst body within the reaction zone at the desired degree of activity.

The provision may be for continuous or periodic removal from the reaction zone of complex thus formed in situ and the removed complex, all or in part, may be subjected to the aforementioned heat treatment so as to render it substantially or relatively non-corrosive prior to return to the reaction zone. The invention is thus applicable to the treatment of either preformed complex or complex formed in situ during the conversion reaction.

It is contemplated that the invention may be employed for the treatment of complex catalysts of the type in question which are used in other hydrocarbon conversion reactions besides isomerization such as alkylation and polymerization.

Obviously many modifications and variations of the invention as above set forth may be made without departing from the spirit and scope thereof, and therefore only such limitations should be imposed as are indicated in the appended claims.

We claim:

1. In the catalytic conversion of hydrocarbons in liquid phase at elevated temperatures below 250° F. in the presence of a liquid aluminum halide-hydrocarbon complex catalyst and a hydrogen halide promoter in a reaction zone bounded by a metal wall which is submerged in the catalyst liquid and normally subject to substantial corrosion thereby, the method which comprises pretreating the aluminum halide-hydrocarbon complex liquid by heating the same in the absence of hydrocarbons in a separate treating zone at a temperature above about 150° F. but not exceeding about 250° F. for a period of time of about 30 to 60 hours to render the complex liquid substantially non-corrosive to boiler steel immersed therein at about 210° F., and then passing the pretreated complex liquid to the said reaction zone to serve as the catalyst therein, whereby the said hydrocarbon conversion takes place in the presence of said pretreated complex liquid and the hydrogen halide promoter without substantial corrosion of said metal wall under the said liquid phase conversion conditions.

2. The method according to claim 1, wherein the catalyst is an aluminum chloride-hydrocarbon complex liquid containing unreacted aluminum chloride, and the promoter is hydrogen chloride.

3. The method according to claim 1, wherein the catalyst is an aluminum chloride-hydrocarbon complex liquid, the promoter is HCl, and the said catalyst liquid is further pretreated in the said treating zone by bubbling HCl gas therethrough following the heating step and before passage of the treated complex liquid to the reaction zone.

4. In the catalytic isomerization of a normal paraffin in liquid phase to the corresponding isoparaffin at elevated temperatures below 250° F. in the presence of a liquid aluminum chloride-hydrocarbon complex catalyst and a hydrogen chloride promoter, wherein make-up aluminum chloride is carried by the normal paraffin feed into the isomerization reaction zone and forms complex liquid in situ in the said isomerization reaction zone, the latter being bounded by a ferrous metal wall submerged in the said complex liquid and normally subject to substantial corrosion thereby, the method which comprises removing complex liquid including that formed in situ from the said reaction zone to a treating zone, heating the said removed complex liquid in the treating zone at a temperature above 150° F. but not exceeding about 250° F. for a period of time of about 30 to 60 hours to render the said complex liquid substantially non-corrosive to boiler steel immersed therein at about 210° F., and then returning the treated complex liquid to the said reaction zone to maintain the liquid catalyst therein substantially non-corrosive to the ferrous metal wall in the presence of the hydrogen chloride promoter and under the said isomerization conditions.

WILLIAM RUSLER SMITH.
WILLIAM F. GLASSMIRE.

REFERENCES CITED

The following references are of record in the file of this patent:

UNITED STATES PATENTS

| Number | Name | Date |
|---|---|---|
| 1,952,898 | Stratford | Mar. 27, 1934 |
| 2,300,249 | Evering et al. | Oct. 27, 1942 |